July 12, 1955 — I. I. BOYD — 2,713,114
HOOD FOR HEADLIGHTS
Filed July 28, 1953
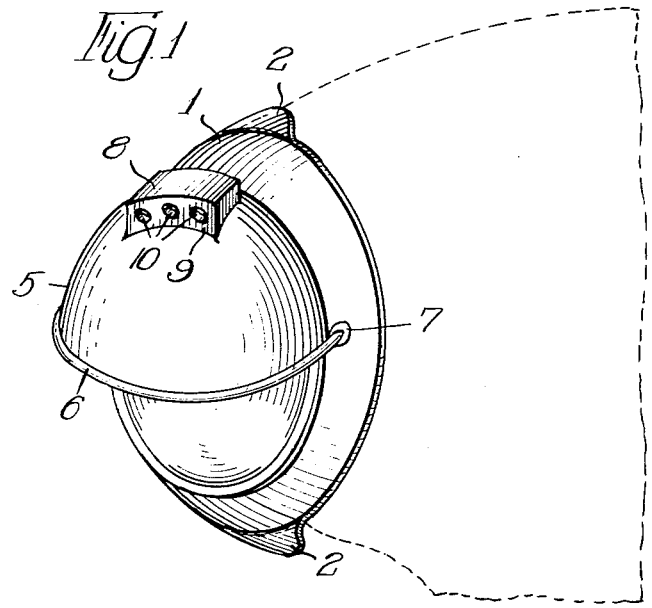
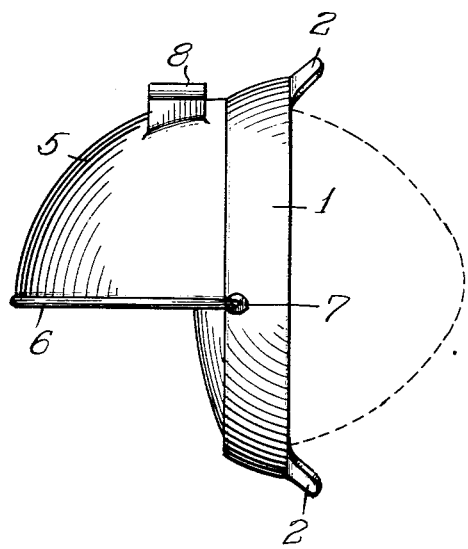
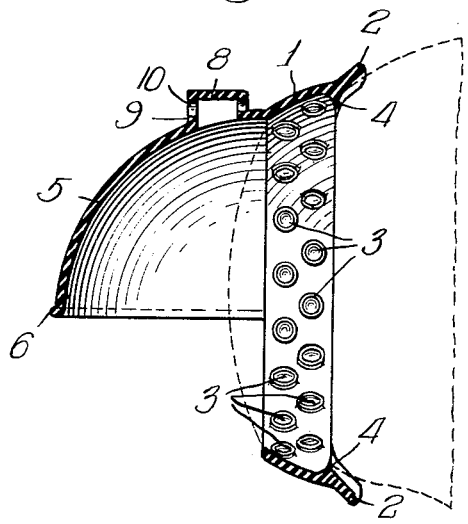
INVENTOR.
Ida I. Boyd,

United States Patent Office 2,713,114
Patented July 12, 1955

2,713,114

HOOD FOR HEADLIGHTS

Ida I. Boyd, Chicago, Ill.

Application July 28, 1953, Serial No. 370,809

4 Claims. (Cl. 240—46.53)

This invention relates to a removable resilient shade for the headlights of automotive vehicles, and has for its principal object the provision of a new and improved device of this kind.

It is a main object of the invention to provide a rubberlike shade that can be attached to the headlight of an automotive vehicle to direct downwardly the light emitted therefrom, thereby to facilitate driving the vehicle under foggy conditions.

Another object of the invention is to provide a shade for the headlights of an automotive vehicle which can be carried in the vehicle and attached to the headlight when needed without the use of tools of any kind.

Another object of the invention is to provide a resilient headlight shade that can be securely attached to headlights of modern design and in which shade provisions are made for the escape of air thereby to prevent air pressure built up in the shade by the movement of the vehicle from stripping the shade from the headlight.

Another object of the invention is to provide a resilient shade for automotive vehicle headlights which can be manufactured at low cost without sacrificing quality.

Further objects of the invention not specifically mentioned here will be apparent from the detailed description and claims which follow, reference being had to the accompanying drawings in which a preferred embodiment of the invention is shown by way of example and in which Fig. 1 is a perspective view of my improved shade;

Fig. 2 is a side elevational view of the shade; and

Fig. 3 is a cross sectional view of the shade.

As will be well understood by those skilled in the art, when foggy conditions are encountered, visibility will be greatly reduced if the rays emitted from the headlights of an automotive vehicle strike the fog within the range of vision of the driver, since the particles of moisture constituting the fog reflect the light rays forming thereby an illuminated air mass through which human vision cannot penetrate. As will also be readily recognized, if the light emitted by the headlights of a car is closely confined to the region immediately adjacent the roadway upon which the car is traveling, and definitely prevented from shining into the strata of moist air thereabove and in the line of vision of the driver, the roadway may be illuminated sufficiently to enable the vehicle to proceed with safety.

In the prior art of which I am aware are numerous shades or awninglike hoods adapted to be attached to the headlights of an automotive vehicle in effort to direct the rays of light emitted therefrom in such manner as to permit safe driving under foggy conditions. Most of these prior art devices are composed of metal and attached to the headlamps more or less permanently with the result that they are in place and function at times when not only are they not needed but their presence is a definite disadvantage. Such devices of the prior art that are detachable require the use of tools to attach and remove them from the headlights and as a result devices of this kind have not gone into general use.

In one prior art patent, namely the German Patent 393,136, issued to Witzel in 1923, there is shown a headlight shade composed of rubber or a rubberlike material. At the time of the issuance of this patent, headlamps were provided with a definite rim or bead to which the device could be attached as by stretching. Modern day automotive headlights, particularly those of passenger cars and light trucks, are formed either in the fenders of the vehicle or are highly streamlined and devoid of outwardly projecting rims or beads such as would enable the use of a device of the kind shown in this German patent.

The present invention provides a resilient rubberlike shade that can be carried in the vehicle and when occasion arises necessitating its use can be attached to the headlight of a modern automotive vehicle without the use of tools.

In its preferred form, the shade of the present invention consists of a mounting cuff or ring of such dimension as to enable it to be stretched over the rim of the headlight. Contained in the inner surface of this cuff are a plurality of recessed bosses which form suction cups, and since the rims of modern day headlights are finished in chrome or other smooth material suction cups aid greatly in securing the device to the headlight.

Formed integral with the mounting cuff and extending forwardly therefrom is a hood which is preferably shaped as a section of a globe and which contains a beaded lower edge that is disposed just below the axis of the headlight to which the device is attached. Located in the upper portion of the hood is an air box having parallel vertical walls which contain perforations through which air, trapped in the plenum between the lens of the headlight and the hood, can escape, thereby preventing this air pressure from stripping the device from the headlight.

Since the hood extends below the axis of the light, the only rays permitted to escape will be those deflected downwardly, and as a result the roadway will be illuminated and the fogbound strata of air in the line of vision of the driver will not be illuminated and the vehicle may proceed with safety. The forward ones of the perforations in the air box may permit a small amount of light to escape from the box thereby to partially restore to view that portion of the headlight blocked out by the hood so as to render the headlight visible to oncoming cars.

Referring now to the drawings in more detail, wherein it will be seen that in its preferred form the shade of my invention comprises a mounting cuff 1 which is formed essentially as a section of a cylinder and is of such dimension as to permit it to be tightly stretched over the rim of a headlight. Projecting from the ring 1 are tabs 2 which facilitate the mounting and dismounting of the device from the headlight.

Located around the inner surface of the cuff 1 and projecting inwardly therefrom are a plurality of recessed bosses 3 arranged in rows which are spaced apart a distance less than the diameter of the bosses. The recesses in these bosses form suction cups which through their engagement with the rim of the headlight aid in holding the device thereon.

Located at the rear edge of the mounting cuff 1 is a bead 4 of V-section and adapted to be registered with the junction of the rim and body of the headlight to form a seal therewith which aids in holding the device upon the light.

Integral with the cuff 1 is a forwardly extending hood 5 which is shaped generally as a section of a globe or sphere. Located around the lower edge of the hood 5 and in a plane disposed just below the center of the light to which the device is attached is a bead 6 which merges into ring 1, as shown at 7 in Fig. 2, to stiffen the hood and thereby enable it to retain its shape against air pressures built up by the forward movement of the vehicle.

Located in the upper part of the hood 5 and adjacent the cuff 1 is an air box 8 having vertical walls 9 that contain perforations 10 through which air trapped beneath the hood can escape. The forward movement of the car builds up a plenum in the space between the hood and the lens of the headlight, and were it not for the escape of air therefrom pressure therein would be built up to the point where the device might be stripped from the headlight. Particularly would this be true when the vehicle runs out of the fog and its speed is increased. By permitting the escape of a certain amount of air through the perforations 10, stripping of the shade from the headlight is prevented even at high speeds. A certain amount of light from the headlight will be visible through the perforations 10 thereby partially restoring to view that part of the headlight which has been blocked off by the shade.

When composed of a rubberlike material such as a synthetic rubber, or of rubber, or of a combination of natural and synthetic rubber, which resilient materials are usually referred to as elastomers, the device of the present invention is rugged, is of light weight, and is sufficiently flexible to enable it to be placed upon and secured to the rim of modern automotive vehicle headlights. When so positioned upon the headlight, the device of the present invention directs the rays down to illuminate the road without at the same time shining on the fog to such an extent that the vision of the driver is completely blocked off.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described the preferred embodiment of the invention, what I consider new and desire to have protected by Letters Patent is pointed out in the appended claims.

What I claim is:

1. A resilient removably mounted shade for headlights of automotive vehicles formed of a molded elastomer and comprising a cuff adapted to be stretched over a headlight rim; a knife edge rim of V-configuration projecting inwardly from one edge of said cuff and adapted to engage with the junction of the headlight rim and casing; tabs projecting rearwardly from said cuff to facilitate registering the same with the headlight rim; a plurality of suction cups disposed on the inner surface of said cuff adapted to engage the headlight rim to aid in holding the shade thereon; a globular shaped hood integral with said cuff and extending forwardly therefrom and downwardly to a horizontal plane just below the horizontal axis of the headlight; and a bead on the lower edge of the hood for stiffening the same, said hood containing perforations through which air scooped up between the shade and headlight can escape.

2. A removably mounted shade for headlights of an automotive vehicle composed of elastomer and comprising a mounting cuff consisting of a continuous ring adapted to be stretched over the rim of the headlight to mount the shade thereon; an inwardly projecting bead of V-section on one edge of said cuff adapted to register with the junction of the headlight rim and casing to form a seal thereat; tabs projecting from the cuff to facilitate stretching the cuff over the rim; a plurality of recessed bosses projecting radially inwardly of said cuff and forming suction cups adapted to engage the headlight rim to assist in holding the shade thereon; a globular shaped hood integral with said cuff and extending forwardly therefrom and downwardly to a horizontal plane disposed immediately below the horizontal diameter of the cuff and headlight; a bead on the planar edge of said hood for stiffening the same; an air box formed in said hood adjacent said cuff, said air box containing perforations to permit the escape of air forced into the space between the headlight and hood thereby to prevent that air from stripping the shade off of the headlight.

3. A shade as claimed in claim 2, in which the air box has parallel vertical walls in which the perforations are located, through which perforations light may pass to partially restore to view the outline of the headlight portion covered by the shade.

4. A shade as claimed in claim 2, in which there are two rows of radially projecting recessed bosses, which rows are spaced apart a distance less than the diameters of the bosses in which rows the bosses are uniformly spaced.

References Cited in the file of this patent

UNITED STATES PATENTS

| | | |
|---|---|---|
| 1,096,381 | Lokerse | May 12, 1914 |
| 1,145,414 | Heiberger | July 6, 1915 |
| 1,346,497 | Jenkins | July 13, 1920 |
| 1,469,545 | Taft | Oct. 2, 1923 |
| 2,313,356 | New | Mar. 9, 1943 |

FOREIGN PATENTS

| | | |
|---|---|---|
| 393,136 | Germany | Apr. 4, 1924 |
| 196,515 | Switzerland | Aug. 1, 1938 |
| 840,533 | Germany | June 3, 1952 |